May 28, 1935. C. S. CRAFTS ET AL Re. 19,591

FOLDING MECHANISM

Original Filed Dec. 14, 1931 3 Sheets-Sheet 1

INVENTORS
C. S. Crafts
C. A. Harless
BY
John E. Morgan
ATTORNEY

May 28, 1935. C. S. CRAFTS ET AL Re. 19,591

FOLDING MECHANISM

Original Filed Dec. 14, 1931 3 Sheets-Sheet 2

INVENTORS
C. A. Hanlard
C. S. Crafts
BY
John D. Morgan
ATTORNEY

May 28, 1935. C. S. CRAFTS ET AL Re. 19,591

FOLDING MECHANISM

Original Filed Dec. 14, 1931 3 Sheets-Sheet 3

INVENTORS
C. S. Crafts
C. F. Harless
BY
John D. Morgan
ATTORNEY

Reissued May 28, 1935 Re. 19,591

UNITED STATES PATENT OFFICE 19,591

FOLDING MECHANISM

Curtis S. Crafts and Charles Alonzo Harless, Oak Park, Ill., assignors to The Goss Printing Press Company, Chicago, Ill., a corporation of Illinois Original No. 1,895,124, dated January 24, 1933, Serial No. 580,930, December 14, 1931. Application for reissue September 9, 1933, Serial No. 688,800

11 Claims. (Cl. 101—409)

The invention relates to new and useful improvements in sheet gripping devices, and in certain aspects thereof more particularly to improved spring grippers or folding jaws especially adapted for use in printing presses.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Figure 1:
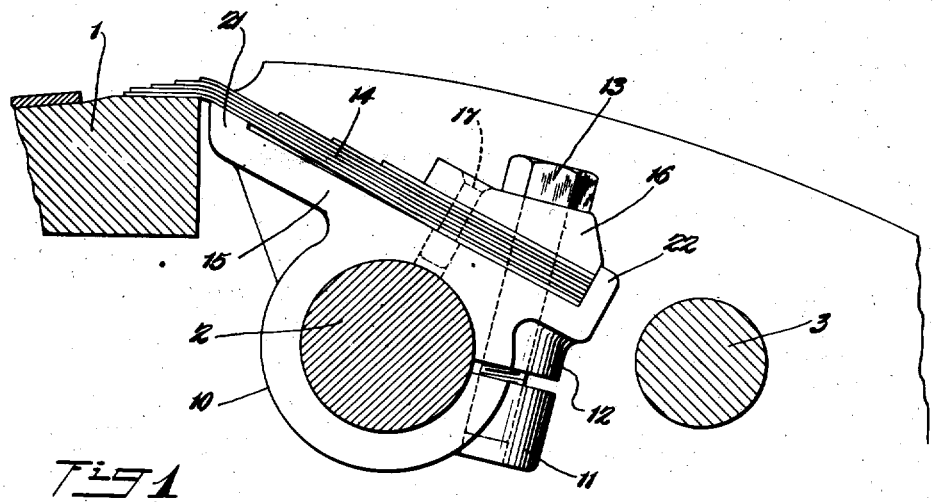
Fig. 1 is a fragmentary view showing in elevation a gripper embodying our invention.

The invention is directed to providing novel and improved sheet taking instrumentalities, operating by a gripping or clamping action, either medianly or on the edge, of a sheet or group of sheets, as in feeding or folding; and in its main features being capacitated for use either in a gripper finger mechanism or a folding jaw mechanism.

The invention provides as a gripping or clamping device, a resilient jaw or finger comprising a plurality of laminated spring leaves gradually increasing in length from the shaft or like support forwardly toward the free end, the engaging pressure being exerted by said resilient forward end. Preferably also the entire laminated spring device is maintained under initial tension, which is immediately imparted to the sheet or sheets at the moment of contact, and prior to any additional pressure that may be applied through further movement of the mechanism.

In accordance with certain features of the invention, these devices are mounted and operated as a plurality of fingers or the like, mounted side by side on an actuating support, such as a rockable shaft, the various members thus exerting an individual resilient gripping or jaw action when engaging the sheet or sheets, but the entire mechanism moving together between open to closed position.

The present preferred embodiment, in its main features, comprises a shaft, or like support, upon which the resilient sheet-engaging and holding instrumentality is mounted; the shaft being rocked through a small angle to effect the opening and closing movement, and this may be done by a cam mechanism of standard or other suitable form. In either the gripper or folding jaw mechanism, there is preferably employed a plurality of sheet-engaging individual members, of laminated resilient spring material, and mounted upon the shaft or equivalent support, whereby they have common opening and closing movement but each member has independent or individual resilient action when engaging the sheet or sheets. Further, in said preferable form, each of the individual resilient sheet-engaging members is constructed and mounted as a unit, and in addition means are incorporated for imposing upon each resilient sheet-engaging member an initial tension. All of the foregoing features conduce to simplicity and efficiency in manufacture, assembling and operation.

Said mechanism when employed as a gripper mechanism, is less liable to breakage than a solid strip or bar of metal; is softer and more flexible in its action, and does not hit the cylinder with a hammer blow, but with a cushion blow which does not loosen the gripper on the shaft, or loosen or disintegrate the shaft and its bearings. Furthermore, the laminated gripper, being very flexible, will take a wide variation in thickness of products without the necessity of resetting, as is the case with stiff, non-flexible gripping members, and permits of side-by-side handling of a product or products of various thicknesses. The gripper can be made relatively small and light with respect to the imposed duty, which greatly eases the strain on the cam motion. The proper tension is also held on the sheet at all times when the gripper is in contact with it, and the sheet is released instantly upon a very small movement of the shaft; that is, there is no lag and unnecessary movement of the shaft to build up tension and release it.

In the embodiment of the invention in a folding jaw mechanism there is rendered possible a very light construction, with a relatively short jaw, whereby the work or strain on the cam is reduced to a minimum, and the tendency of a heavy jaw to knock to pieces or disintegrate the cam mechanism is obviated. The folding jaw may be formed in a plurality of members opening and closing together, but having individual resilient action during the folding operation. The individually resilient jaw will hold products varying relatively greatly in thickness, and it will be found unnecessary to reset the jaw in case products of different thicknesses are run side-by-side.

In the employment of the invention, either as a gripper or folding jaw, devices are provided for imposing on each individual member initial spring tension, which gives an instantaneous preliminary pressure of predetermined magnitude the moment the gripper finger or folding jaw engages the paper, and it is unnecessary to have an increased movement of the shaft or like support to build up this tension. This gives a uniform tension with a minimum amount of throw.

Referring now in detail to the present preferred embodiment of the invention illustrated by way of example in the accompanying drawings, a form of double gripper mechanism, such as is frequently employed on cylinder sheet-fed presses, is shown in Fig. 1. The cylinder structure is indicated at 1, and a pair of gripper supporting and actuating shafts 2 and 3 are shown mounted in the cylinder. These shafts are periodically rocked through a small angle, in the usual manner, and this may be done by any standard, well-known, or other suitable mechanism (not shown).

Figure 3:
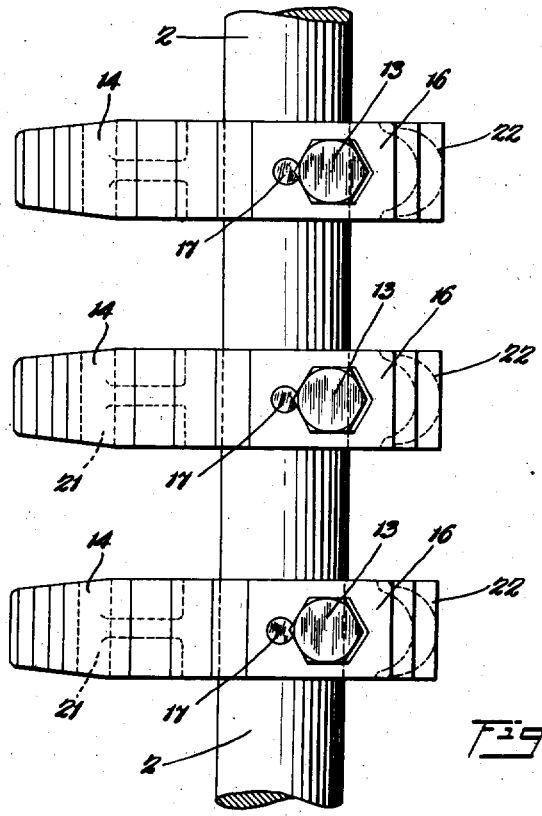
Fig 3 is a plan corresponding to Fig 1.

As so embodied, for each of the individual gripper fingers, a plurality of apertured supports 10 are mounted on the shaft 2 or 3, the supports being spaced along the shaft (Fig. 3). These supports are split, are slipped on the shaft, and have two lugs 11 and 12 facing at either side of the split, lug 11 being internally apertured and screw-threaded. A bolt 13 is screw-threaded into the lugs, to firmly clamp the member 10 in its position upon the shaft. The sheet-engaging member comprises a plurality of laminated, superposed leaf springs 14, which are mounted upon a support 15, and abut against a lug 22, both preferably formed as a part of the supporting member 10. An upper or outside retaining member 16 rests upon the springs and also preferably abuts against lug 22, and the gripping finger and supports are held together by suitable means such as a rivet 17. The laminated leaf springs 14 are of graduated length, increasing forwardly toward the front or sheet-engaging end. The means for placing the gripper finger under initial tension is preferably a part of the supporting member 10, and as shown, a projection 21 is formed in the forward end of the member 15 projecting toward the laminated spring finger 14, whereby the gripper finger is under a desired initial tension between the parts 16 and 21, and a corresponding pressure is immediately transmitted to the sheet or sheets as soon as it is engaged by the gripper finger.

Figure 2:
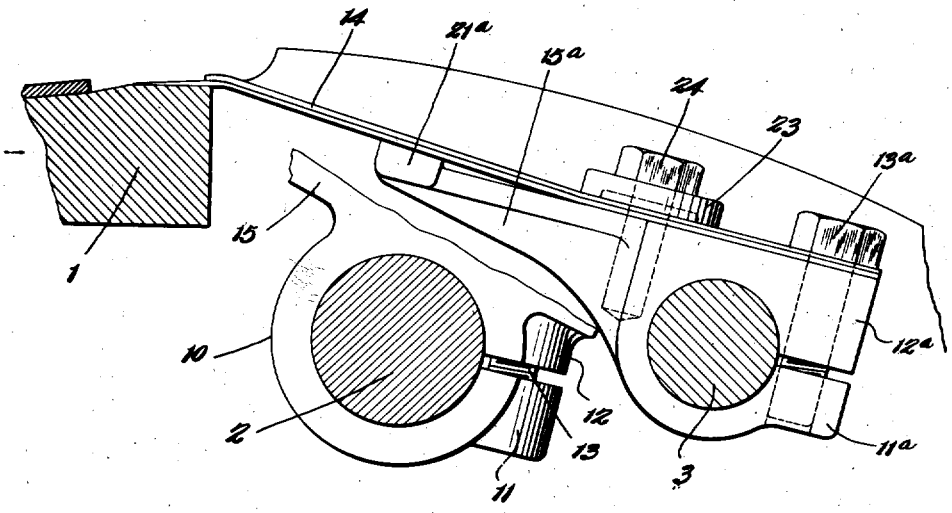
Fig. 2 is a fragmentary view showing in elevation a somewhat different form of gripper embodying the invention.
Figure 4:
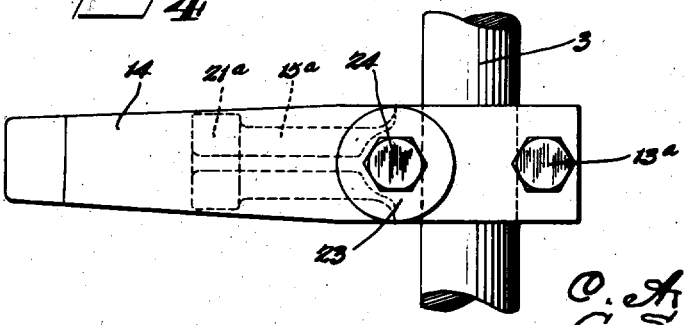
Fig. 4 is a plan corresponding to Fig. 2.

In Fig. 2 a similar construction is shown, mounted on supporting and actuating shaft 3, and operating as an auxiliary gripper, cooperating with a gripper of the type shown in Fig. 1, mounted on shaft 2, and acting as the main gripper. The construction is substantially the same as that described, except that a less powerful spring pressure is used, and the gripper finger is accordingly shown with only two laminae. The top holding or clamping piece 23 is of circular cupped form, and is held in place by a machine bolt 24 (Figs. 2 and 4). Certain of the parts shown in Figs. 2 and 4 and designated by "a" following the reference character may be identical with similar parts in Fig. 1.

Figure 5:
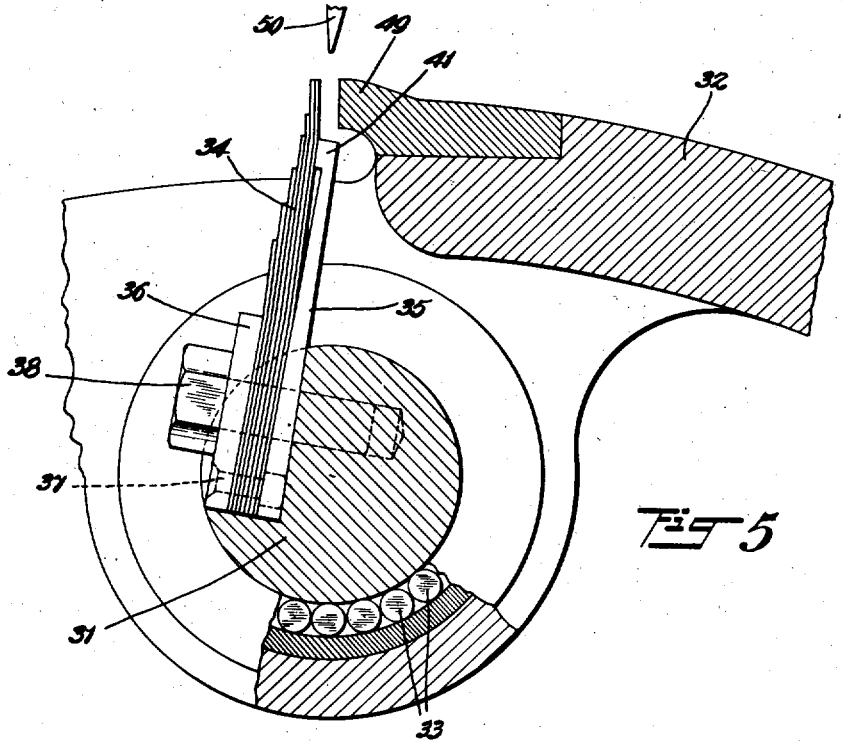
Fig. 5 is a fragmentary section on line 5—5 of Fig. 6 showing in elevation a folding jaw embodying the invention.
Figure 6:
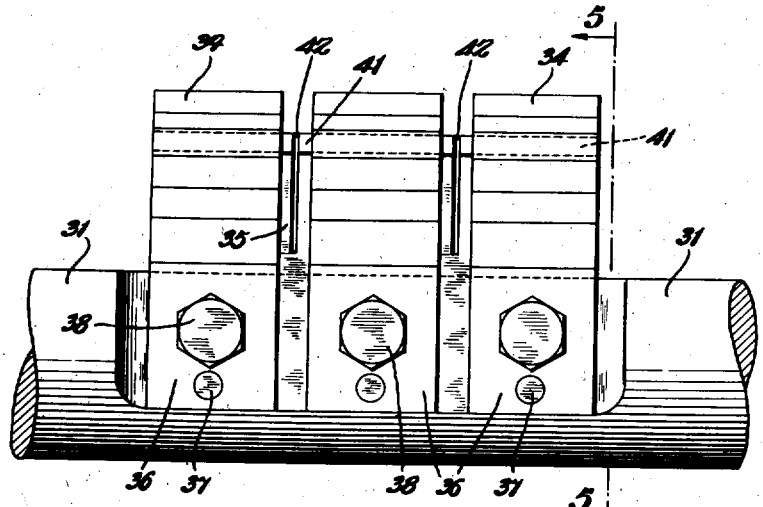
Fig. 6 is a plan corresponding to Fig. 5.

The invention as embodied in a folding jaw is exemplarily shown in Figs. 5 and 6, mounted on a cylinder or like member 32. The supporting and opening and closing means is shown comprising a shaft 31, mounted in the cylinder 32, by means of ball bearings 33. The shaft 31 is actuated by any suitable means, such as a standard cam mechanism, or other mechanism as found convenient or desirable. The gripper jaw preferably comprises a plurality of side-by-side, spaced-apart resilient members, each comprising a plurality of superposed laminated spring members 34 of graduated length from the back toward the front of the folding jaw. The resilient jaw members 34 are mounted on a supporting plate 35 underneath and have a holding and clamping plate 36 above. The entire spring member structure is fastened together by a rivet 37. The entire device is seated in a recess in shaft 31 and the rear end of the device abuts on the rear wall of the recess, and it is held in place by a machine bolt 38 passing therethrough and screw-threaded into the shaft 31.

In the embodied form of means for placing the various folding jaw members under initial spring tension, the forward end 41 of the plate 35 is projected upwardly so as to slightly flex the spring members 34 between the part 41 and the top plate 36. The support 35 may be integral longitudinally, and to afford the individual resilient action and regulation, plate 35 may be slotted, as shown at 42, between the respective spring members 34, and these may be individually bent slightly to vary the initial spring tension on the various members. A folding jaw 49 is shown, mounted on cylinder 32, and this may be of any known or suitable form or construction, and may be provided with any desired adjustments. A suitable folding blade is indicated at 50.

The invention in its broader aspects is not limited to the specific mechanisms shown and described but departures may be made therefrom within the scope of the accompanying claims without departing from the principles of the invention and without sacrificing its chief advantages.

What we claim is:—

1. A gripping device including in combination a laminated leaf spring jaw and a shaft by which it is moved between open and closed positions.

2. A gripping device including in combination a shaft, and a gripping device mounted thereon and comprising a plurality of laminated spring leaves of graduated length, said shaft being oscillatable to effect the gripping action.

3. A gripping device including in combination a gripping member comprising a plurality of spring leaves of graduated length, and a support for said gripping member movable between gripping and non-gripping positions.

4. A gripping device including in combination a laminated leaf spring gripping member, means for imparting initial tension to said member, and a shaft by which said member is moved between gripping and non-gripping positions.

5. A gripping device including in combination a jaw comprising a plurality of laminated leaf springs of graduated length forwardly, a cooperating jaw mounted for opening and closing movement, said laminated jaw having gripping contact near its forward end.

6. A gripping device including in combination a longitudinal support, a plurality of separate laminated spring gripping devices mounted on the support, said support and spring devices being movable together between gripping and non-gripping positions.

7. A gripping device including in combination a rockable shaft, a jaw member comprising a plurality of laminated leaf springs of graduated length forwardly, and means for imposing preliminary tension on the laminated spring jaw member.

8. A gripping device including in combination a rockable shaft, a rigid support mounted thereon, and a jaw member comprising a plurality of laminated leaf springs of graduated length forwardly, means on the support for imposing preliminary spring tension on the laminated spring jaw member.

9. A gripping device including in combination a shaft, a plurality of spaced apart laminated, leaf spring sheet holding members mounted on the shaft, means for imposing initial spring tension independently on the various sheet holding members, said shaft and sheet holding members being movable between open and closed position.

10. A gripping device including in combination a shaft and a plurality of gripping means mounted thereon, each comprising a plurality of spring leaves of graduated lengths with their sheet-engaging ends in close proximity to each other said shaft being oscillatable to effect the gripping action, said device permitting the running of widely different sizes of products without adjustment.

11. A gripping device including in combination a rockable shaft, and a plurality of laminated spring leaf grippers mounted on said shaft, said grippers permitting the different sized products to be run side-by-side without change of adjustment.

CURTIS S. CRAFTS.
CHARLES ALONZO HARLESS.